J. W. EASTEP.
AUTOMATIC HEADLIGHT CONTROL.
APPLICATION FILED JUNE 29, 1914.
1,132,919.
Patented Mar. 23, 1915.
3 SHEETS—SHEET 1.
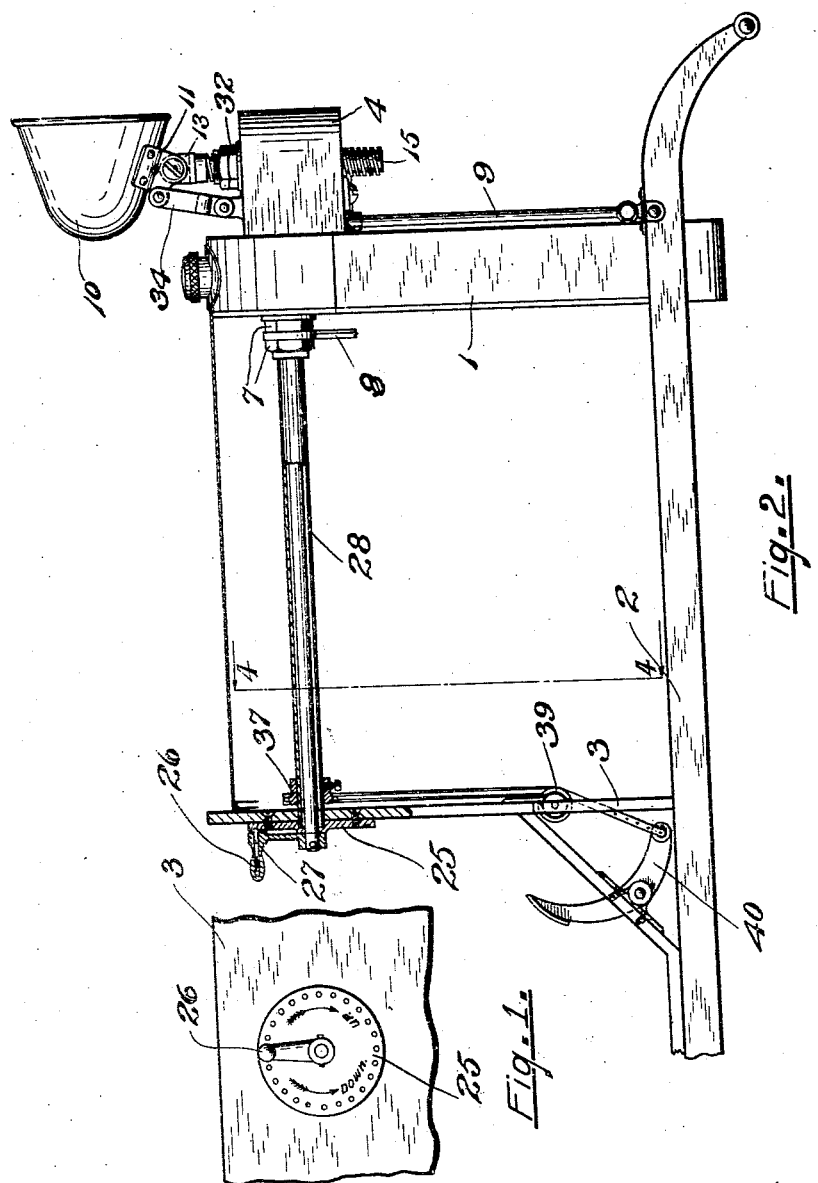
Witnesses
Howard H. Yarrington
Inventor
John W. Eastep
By Moulton
Attorneys.

J. W. EASTEP.
AUTOMATIC HEADLIGHT CONTROL.
APPLICATION FILED JUNE 29, 1914.

1,132,919.

Patented Mar. 23, 1915.
3 SHEETS—SHEET 2.

Witnesses
Howard H. Yarrington
Mae Parker

Inventor
John W. Eastep
By Moulton & Livrance,
Attorneys.

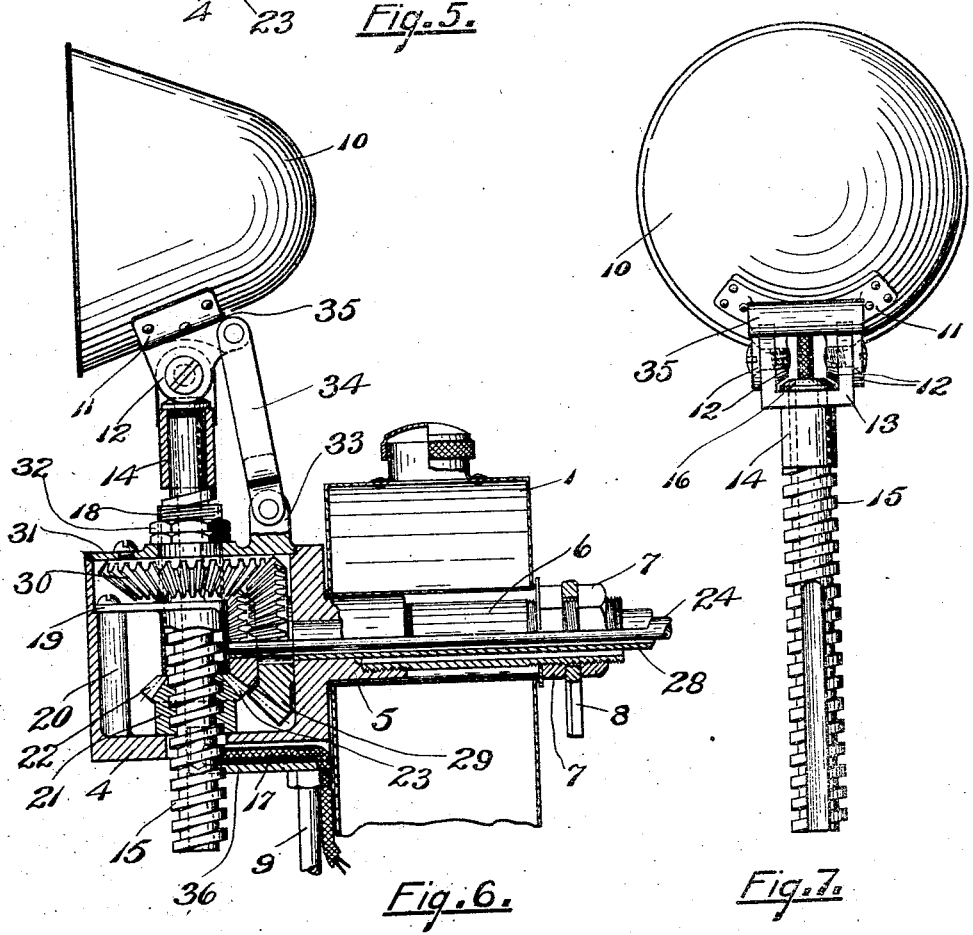

UNITED STATES PATENT OFFICE.

JOHN W. EASTER, OF SOUTH BEND, INDIANA.

AUTOMATIC HEADLIGHT CONTROL.

1,132,919.   Specification of Letters Patent.   Patented Mar. 23, 1915.

Application filed June 29, 1914. Serial No. 847,916.

*To all whom it may concern:*

Be it known that I, JOHN W. EASTER, a citizen of the United States, and a resident of the city of South Bend, in the county of St. Joseph and State of Indiana, have invented a certain new, useful, and Improved Automatic Headlight Control, of which the following is a specification, which, taken in connection with the accompanying drawings, fully discloses a practical and working embodiment of the same, such that others may understand the construction and operation thereof.

This invention relates to head lights and means for controlling said lights, and is concerned chiefly in various new and useful improvements in the construction disclosed by my former application, Serial No. 819,541 filed February 18, 1914.

Broadly, this construction shown herein is to be used, and may be used in substantially the same manner as indicated in said previous application, the invention herein consisting in different arrangements of parts, assembling and construction thereof which greatly simplify the structure, making it more durable and efficient for the purposes to which it is to be put.

Figure 3:
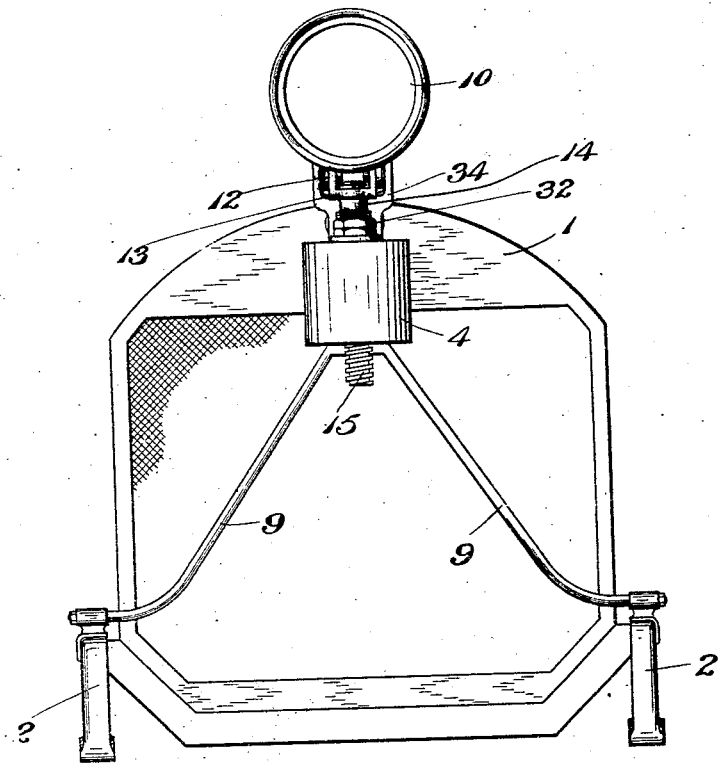
Figure 4:
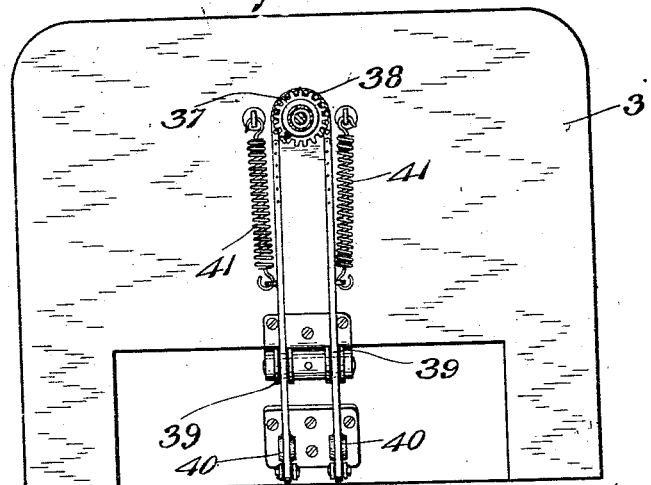

In the accompanying drawings: Figure 1 is a detail elevation of a portion of the dash and the manual means for controlling the vertical movement of the light; Fig. 2 is a partial side and sectional view of the head light shown applied to a motor vehicle; Fig. 3 is a front view of said light and vehicle; Fig. 4 is a view taken on the line 4—4 of Fig. 2; Fig. 5 is a plan view of the support for the head light, parts being removed to disclose interior structure; Fig. 6 is a partial vertical sectional view of the mechanism by which the movements of the light are controlled; and Fig. 7 is a rear view of the light and the immediate supporting post therefor.

Similar reference numerals refer to similar parts throughout the several views of the drawing.

This invention is shown as applied to a motor vehicle, but it is to be understood that its application is not limited to any particular class of vehicles, but may be used on trains, watercraft, or other vehicles of transportation in the same manner as a motor vehicle. The motor vehicle includes in its structure, a radiator 1 which is supported in the usual manner by the frame members 2 of the vehicle, a dash 3 being located to the rear of the radiator as will be understood by those familiar with motor vehicle construction. Supported at the front of, and near the top of the radiator, is a cup-like casing 4, the top thereof being open, and at the rear side of said casing a lug 5 is formed bored interiorly and threaded to receive a short section of pipe 6, the pipe being threaded at its inner end to receive two nuts 7, between which brace bars 8 may be secured. In front of the radiator a pair of brace members 9 are attached to the lower side of the casing 4 and at their lower ends connected by any suitable construction to the frame members 2 of the vehicle. The braces 8 are positioned immediately to the rear of the radiator and are similarly permanently attached to the frame members 2. The lug 5 and pipe 6 extend through a sleeve, reaching from the front to the rear of the radiator and by means of the brace members 8 and 9 the casing 4 is attached and held positively in position with reference to the radiator.

The lamp or head light 10 may be of any preferred construction and has secured on the under side thereof a member 11 which is provided with downwardly extending ears 12 adapted to be pivotally attached to the upstanding portions of a yoke 13 formed at the upper end of the sleeve 14, which is mounted for free rotative movement at the upper end of a screw threaded post 15, the post being formed with a head 16 above the yoke 13, retaining the post and sleeve in permanent engagement. The said post 15 is slotted for a portion of its length and bored interiorly for the remainder of its length, making a passage for the wires 17, by which current is supplied for lighting the lamp.

The post 15 is located so as to pass vertically through the casing 4, passing through a sleeve 18 which, between its ends, has attached thereto a horizontal plate 19 which is secured by means of screws to the lugs 20 cast integral with the casing 4. The sleeve 18 is supported at its lower end by a nut 21 into which the post 15 is threaded, said nut at its upper end being formed with a bevel pinion 22 meshing with a similar pinion 23 fixed on the end of a rod 24 which extends through the side of the casing, the lug 5 and pipe 6 rearwardly terminating back of the dash 3. A circular plate 25 is permanently secured to the dash and furnishes bearing for the rear end of rod 24, said rod being provided with a handle 26 carrying a spring pressed pin 27 which is adapted to engage with any one of the plurality of shallow recesses formed in plate 25, as best shown in Fig. 1. It will be apparent that upon manual operation of the handle 26, pinions 23 and 22 will be rotated, and that the rotation of pinion 22 will serve to raise and lower the post 15 and the lamp 10 attached thereto.

The rod 24 heretofore described, is located lengthwise of a tube 28 which is seated at its rear end in a bearing in the plate 25, being freely rotatable therein, said tube extending forward through the radiator and casing and provided at its forward end with a bevel gear 29 located immediately to the rear of the pinion 23 and meshing with a gear 30 secured in any suitable manner to the cover plate 31 which closes the open top of the casing 4. This cover plate is loosely received by the sleeve 18 and may be rotated in a horizontal plane about such sleeve, the sleeve extending a short distance above the cover plate and being threaded to receive nuts 32 which prevent vertical movement of the cover plate with respect to the casing 4.

Integrally formed with the cover plate 31 is an upwardly extending lug 33 between which and a journal 35 formed integrally with the member 11, extends a yoke 34, said yoke at each end having pivotal connection with the lug 33 and journal 35. A member 36 is secured below the casing 4 and has a portion extending into the slot of the post 15, the said member 36 being a passage way for the electric wires 17, it being clear that the post 15 is held against rotation by reason of the engagement of the member 36 therewith. The tube 28 is provided with a sprocket wheel 37 at a point immediately in front of the dash 3 and a sprocket chain 38 passes over said wheel extending downwardly at either side and being guided around idle pulleys 39, the ends having attachment to the two foot levers 40. It is evident, of course, that the sprocket chain may form only the central section of this member and that the end portions may be of any suitable flexible material. Coiled springs 41 are attached, one at either end of the central sprocket section, the function of which is to normally position the sleeve 28 and the parts connected thereto so that the rays of light from the lamp will project directly ahead.

In operation, by manual operation of the handle 26, the post 15 may be raised or lowered as desired, and it will be clear that with the elevation of the post the lamp will be tilted to throw the rays of light farther ahead along the road on which the vehicle is traveling and with the lowering of the post the tilting will be in the opposite direction, so that, if desired, the light may be brought to a point directly ahead of the vehicle, this tilting being accomplished through the yoke 34. It requires but a small movement of the handle 26 to tilt the light to any desired angle. By operation of either of the pedals 40 the light may be swung horizontally, one pedal throwing the light to one side and the other pedal to the other side of the road. Upon release of the pedal springs 41 will bring the light back to its normal central position.

From the foregoing, it will be evident that I have provided a simple and efficient construction for effecting the purposes of my invention.

Various modifications in structure may be resorted to without departing from said invention, which is defined in the appended claims, and I consider myself entitled to all modifications falling within their scope.

Having thus described my invention, what I claim as new and desire to secure by Letters Patent, is:—

1. In a device of the character described, a lamp, an upright post, a sleeve loosely mounted at the upper end of the post, said lamp being pivotally mounted on a horizontal axis on said sleeve, means for raising and lowering the post, sleeve and lamp, an element relatively stationary with respect to a horizontal plane positioned adjacent the post and a connection between the lamp and said element, substantially as described.

2. In a device of the character described, a lamp, a screw threaded upright post, a sleeve loosely mounted on the upper end of said post, connections between the sleeve and lamp whereby the lamp is mounted for pivotal movement on a horizontal axis below the lamp, a support for the post, means for raising and lowering the post relative to said support, an element mounted for rotative movement in a horizontal plane about the post, and a connection between the lamp and said element, substantially as described.

3. In a device of the character described, a casing having an open top, a screw threaded post positioned vertically and passing through said casing, means for vertically moving said post, a lamp mounted on said post for pivotal movement about vertical and horizontal axes, a cover plate for said casing mounted for rotative movement about the post, and a connection between the lamp and cover plate.

4. In a head light, a casing having an open top, a screw threaded post positioned vertically and passing through said casing, means for vertically moving said post, a lamp mounted on said post for pivotal movement about vertical and horizontal axes, a cover plate for said casing mounted for rotative movement about the post, a connection between the cover plate and lamp, and means for rotating the said cover plate about the post.

5. In a head light, a casing having an open top, a screw threaded post positioned vertically and passing through said casing, means for vertically moving said post, a lamp mounted on said post for pivotal movement about vertical and horizontal axes, a cover plate for said casing mounted for rotative movement about the post, a connection between the cover plate and lamp, a bevel gear fixed to the cover plate, a bevel gear meshing therewith, a shaft connected to the said second gear, and means for rotating the shaft a limited amount in either direction.

6. In a head light, a casing having an open top, a cover plate therefor, a post passing vertically through casing and cover plate, said plate rotatable in a horizontal plane about the post, a lamp carried on upper end of post and rotatable thereon, a connection between the lamp and cover plate, gearing associated with the cover plate for rotating it about the post, and means by which the gearing may be operated, substantially as described.

7. In a head light, a lamp, a vertical post, a sleeve loosely carried at the upper end of the post, said lamp being pivotally mounted on a horizontal axis on the sleeve, means for elevating the post and means for moving the lamp about the horizontal axis as the post is elevated, substantially as described.

8. In an automobile, a radiator, a casing, a lamp supported above the casing, mechanism for raising and lowering the lamp and for rotating it in a horizontal plane located in the casing, said casing lying adjacent the upper position of the radiator and at the front thereof, an extension to the casing passing through the radiator, supporting braces attached to the under side of the casing at the front of the radiator and supporting braces connected to the extension to the casing back of the radiator, substantially as described.

9. In a head light, a casing, a screw threaded post vertically positioned therein and extending therethrough, means restraining the post from rotation, a nut threaded on the post and resting on the base of the casing, a bevel pinion formed at the upper end of the nut, a pinion meshing with said first pinion, means to manually rotate the second pinion, and a lamp carried at the upper end of the post above the casing, substantially as described.

In testimony whereof I affix my signature in presence of two witnesses.

JOHN W. EASTEP.

Witnesses:
 GEO. A. LANG,
 THAD. M. T. ALCOTT, Jr.